United States Patent Office 3,509,352
Patented Apr. 28, 1970

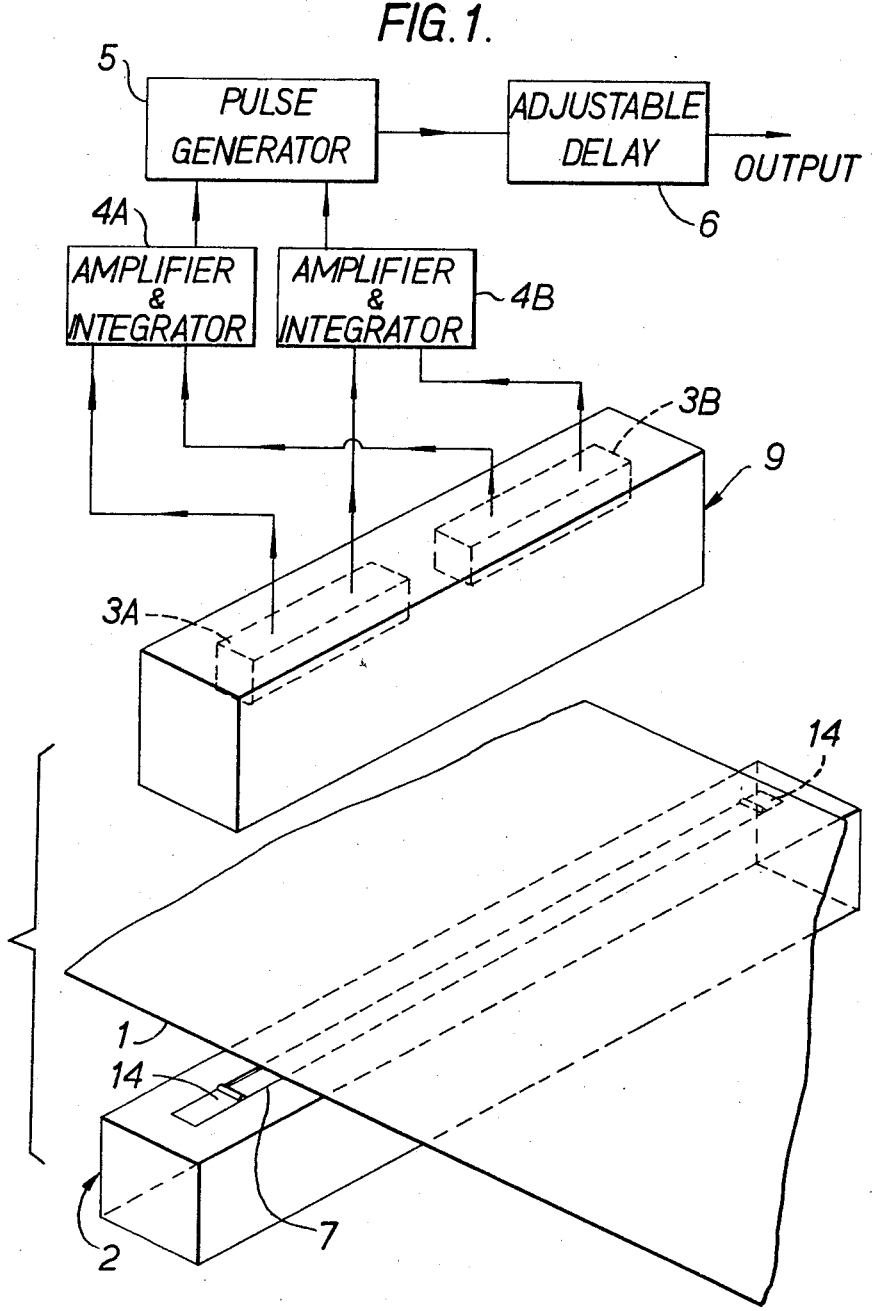

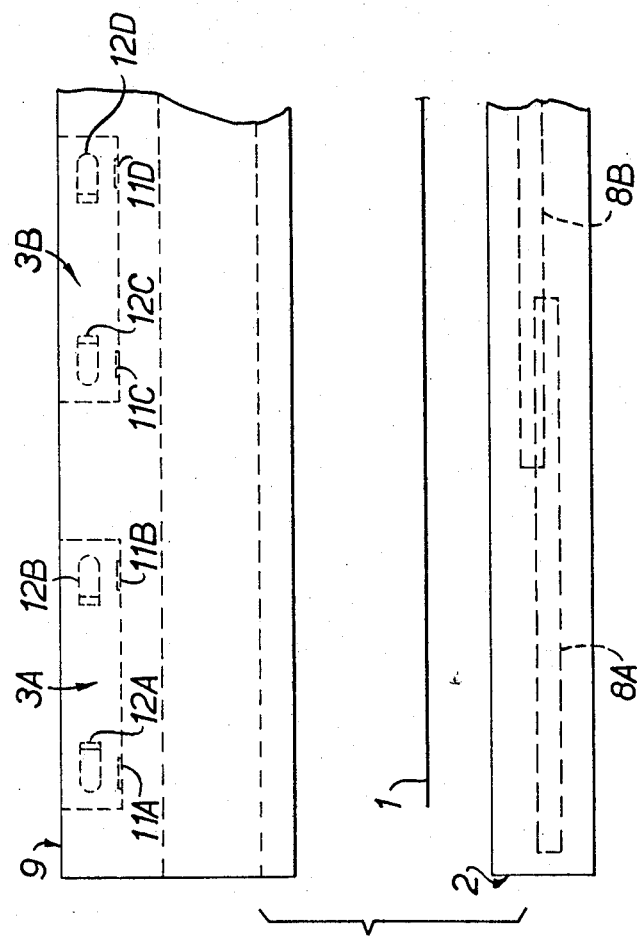
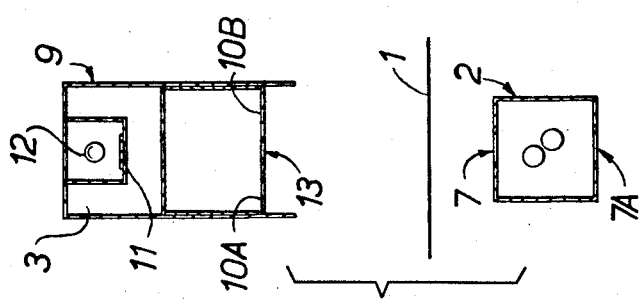

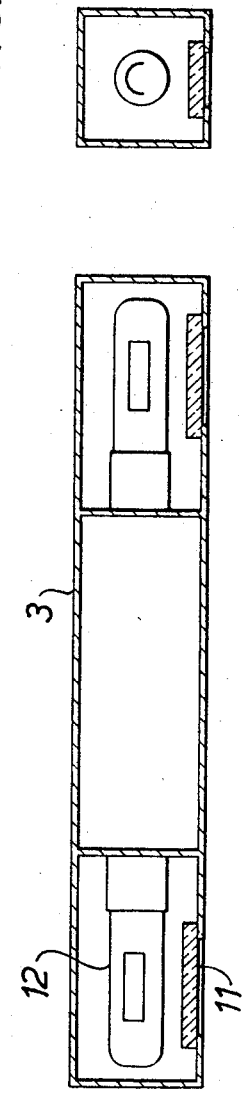

3,509,352
HOLE DETECTOR FOR SHEET MATERIALS
Paul Nash and Gordon Brian Hick, Ottawa, Ontario, Canada, assignors to Nash and Harrison Limited, Ottawa, Ontario, Canada
Filed Sept. 19, 1966, Ser. No. 580,495
Claims priority, application Canada, Sept. 23, 1965, 941,277
Int. Cl. G01n 21/16, 21/32
U.S. Cl. 250—219
8 Claims

ABSTRACT OF THE DISCLOSURE

Means for detecting defects such as holes in moving sheet material, the sheet material being opaque to radiation in the region of 3500 to 4000 A., including projecting such radiation onto one surface of the sheet material and detecting radiation passing through said holes or thin spots by means at the opposite side of the moving sheet material.

---

This invention relates to new and useful improvements in ultra-violet light sensitive photoelectric inspection apparatus for the detection of holes in sheet materials which may be travelling at high speed.

It is often necessary in the manufacture of products that holes or voids in the product be reliably detected, counted, recorded and, following such detection, preventive action be taken to eliminate the occurrence of such defects; also defective sections may have to be marked for later removal, or be automatically removed, before the product is used in its final form.

When the inspected product is sheet paper or plastic, it usually moves in continuous form at speeds as high as 6,000 feet per minute between and over a very large number of rollers and similar handling means. A typical example is an up to date Fourdrinier machine making newsprint. On such a machine the lack of uniformity of the consistency of the pulp stock, or deposits of foreign matter on rollers, or the presence of such matter in the pulp stock, or damaged wire and felt belts create holes or voids in the sheet material, which weaken the strength of the sheet and often result in a break and interruption of production. Immediate and early detection of voids on such a machine is today an accepted aid for efficient and uninterrupted production. It is important that the inspection apparatus should not interfere with the smooth flow of the sheet material through the machine and it should not add to the machine operator's burden. Hence, members of the inspection apparatus are advantageously positioned many inches away from the sheet material. Convenient locations for members of the inspection apparatus are locations between supporting rollers of the particular processing machine. Often, the fast flowing sheet material is unsupported for distances of many feet between rollers and therefore the material can move and flutter in such locations. It is an essential characteristic of the inspection apparatus that it should not respond to the flutter of the sheet materials.

When the inspection apparatus is used in the manufacture of materials which are ordinarily cut into sheets, it is particularly useful, in that the output of the detectors may be used through the associated utilization devices, to sort the product into two compartments, through the use of a rejecting gate or deflector. In this way, only sheets which are free from holes are stacked in the one compartment, while those containing holes are diverted into the other compartment.

In such "sheeter-sorter" machines with two compartments or "layboys" (an expression normally used in the trade), the condition for accurate selection of cut defective sheets is a sharp "inspect line" located at right angles to the motion of the sheet material. One feature of the present invention is an aperture system which defines a sharp inspect line and at the same time allows the location of members of the inspection apparatus to be several inches from the sheet material.

Some efforts have been made to detect holes by flooding one side of the material with strong light in the visible spectral range and using photoelectric means to observe the opposite side. It will be appreciated that the amount of light passing through a small hole in the material is minute in comparison to the amount of stray light present in the inspection area. Hence, considerable difficulties have been encountered due to undesirable ambient light fluctuations as well as from the fact that most paper is, in the visible spectral range, more or less translucent in nature, and non-uniformity in the translucency, emphasized by the flutter of the material, produced greater changes of light than the change due to light transmission through the hole as sensed by the photoelectric means.

Other efforts have made use of very short wave ultraviolet radiation with the detection accomplished through the use of complex filters containing phosphors to convert this radiation to the visible part of the spectrum. This necessitates the use of extremely sensitive detection means due to the high losses in the conversion process.

For example, U.S. Patent No. 3,128,385 employs as a transmitter lamps with radiant peak energy at the wavelength of 2,537 angstrom units; it employs as a receiver an ultra-violet filter coated with a phosphor, two filters passing light within the visible spectrum and a photocell sensitive to such visible electromagnetic energy.

An essential feature of the present invention is to employ a system which we prefer to term as "selective filtering." In other words, improve the selectivity of the receiver for the particular wavelength at which the ultraviolet lamp transmits maximum energy and to do this in at least two stages. For example, the use of a narrow band selective glass filter transparent to the wavelengths of the transmitter, followed by a photocell, the sensitivity of which again is narrow and is peaked to the wavelength of the transmitter. Such a system has an order of magnitude greater capacity for rejecting visible radiation than the sandwich type filter system specified in U.S. Patent 3,128,385.

In addition, further improve the selectivity of the receiver by using a differential amplifier system associated with at least two receivers (photocells), which do not sense the changes of the ambient radiation energy because such affect in-phase and, substantially at the same level, both receivers connected to the differential amplifier system and hence are not amplified.

This invention also takes advantage of the fact that most ambient light contains little or no energy in the "near" ultraviolet region, that is to say, wavelengths of the order of 3,650 angstrom units. In addition, paper and paper products are opaque to radiation at these wavelengths, even though they may be translucent to visible light.

One feature of the invention relates to the use of a filter element which transmits freely in the region of 3,650 A., yet is highly absorptive to visible light, said filter element being used to exclude extraneous visible radiation from the photo sensitive detectors.

Another feature of the system relates to the use of simple two element photoelectric cells as opposed to multi-element photo-multiplier tubes. The attendant simplicity and elimination of high voltage power supplies will be apparent to those who are skilled in the art. This is possible through the direct detection of the said ultraviolet energy, rather than conversion of this energy (through the use of various phosphors) to a longer wavelength, which is always accompanied by considerable energy losses.

Signal intelligence in response to variations in ambient light, sources of interference containing ultra-violet radiation such as electric arcs, due to changes in translucency of the inspected material or flutter, are known in the art by the generic term "noise." Signals the generated only by the holes in the inspected material are termed in art as "useful signals" or simply "signal." In order to detect the smallest holes, the "signal-to-noise ratio" of the system must be as high as possible. The above referred to features of our invention already ensure an exceptionally high signal-to-noise ratio, and the detection of holes having diameters of .020 inch or less at speeds up to 6,000 feet per minute, in a wide range of translucent and transparent materials, such as bond, tissue and tracing papers, plastic materials such as thin cellophane foils, or glass.

In order to further improve the sensitivity of our inspection system to small holes, another feature of our invention relates to the use of an integrator associated with each amplifier. The use of said integrator, resulting in considerable increase of sensitivity through its ability to detect small signals, enables the detection of very small holes.

Further features and advantages of the system will become apparent through the following description of a preferred embodiment which is shown in the diagrams where:

FIGURE 1 is a diagrammatic view partially in block form, of a hole detecting apparatus constructed according to the present invention.

FIGURE 2 is a view of the illuminating and detection apparatus and their positions with respect to the work to be inspected.

FIGURE 2A is an end elevation of the apparatus of FIGURE 2.

FIGURE 3 is a view, in section, of one of the photoelectric units.

FIGURE 3A is an end elevation of the apparatus of FIGURE 3.

Figure 4:
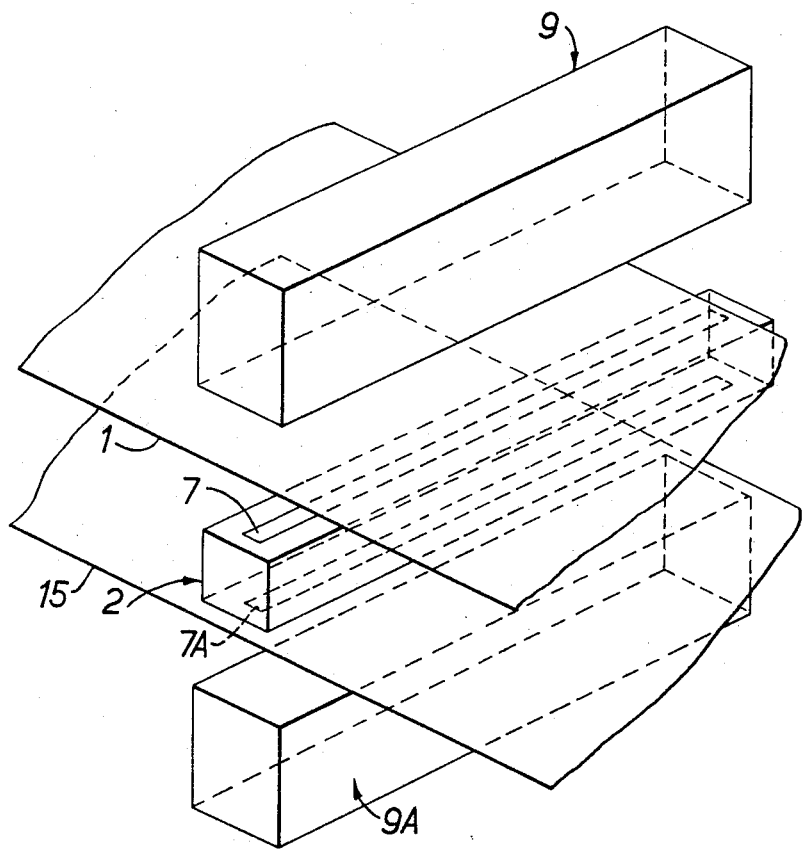
FIGURE 4 is a diagrammatic view showing a second embodiment of the invention wherein two sheets of the work may be inspected for holes simultaneously.

In FIGURE 1, sheet 1 is a continuation sheet of the medium to be inspected, travelling at any speed (say from 50 to 5,000 feet per minute) between rollers or other handling means not shown. Although there is no limit to the physical nature of the inspected material other than that it shall be substantially opaque to the said radiation at 3,560 angstrom units of wave length, for simplicity it shall be paper in this instance.

The said paper is illuminated on one side by radiation from lamps 8A and 8B pasing through aperture 7 in lamp housing 2. As shown most clearly in FIGURE 2, the lamps 8 are so positioned and overlapped as to provide an illumination of nearly uniform intensity in a direction transverse to that of the paper flow. The lamps used are of the type sold commercially as "black light" lamps, their output being substantially restricted to that portion of the spectrum in the region of 3,650 angstrom units of wave length. This radiation is not harmful to the skin or eyes and so presents no hazard to the operator of the equipment. One or more lamps 8 may be employed in accordance with the width of the material to be inspected.

As has been stated, one of the requirements for reliable operation is to provide uniform intensity of illumination of the work in a direction transverse to the flow of the work. This purpose is served in two ways, one of which includes the use of a source of well filtered direct current for the lamps 8. In this manner, flicker or periodic variation in intensity due to an alternating current source is eliminated. Secondly, as is well known in the art, tubular fluorescent lamps when operated on direct current, develop a blackening or dark region at one end due to migration of the mercury vapour. Reduction of this effect is accomplished through the use of polarity reversing means, said means reversing the direction of current flow in the lamps from time to time. Such means may be operated either manually or automatically using timing devices well known in the art.

Furthermore, the overlapping of the lamps for a short distance, and their being offset as seen in FIGURE 2, reduces such effects to negligible proportions.

As also shown in FIGURE 2, the lamp 8A nearest the edge of the work is allowed to project beyond the edge of the said work in order that the inspection efficiency is not impaired due to end effects in the lamp.

Also, the electrical amplifying system cannot respond to lamp supply voltage variations when the frequency of such voltage variations is outside the range of the frequency response of the amplifying system. Hence, it is desirable to limit the low frequency response of the amplifier and use a low-limiting time constant of approximately one second. The high frequency response of the amplifier is limited to approximately 20,000 cycles per second at the —3 db upper response level, so that the smallest hole be still detectable at the highest operational speed of the sheet material through the processing machine.

Hence, the stability of the D.C. potential supplying the lamps is not critical beyond the one second time constant, or beyond the 20,000 cycle frequency limit. Therefore, an A.C. lamp supply source excited at, say, 30,000 times per second can displace the D.C. source.

In order to provide for various widths of work to be inspected, adjustable shades 14 are provided at the ends of the lamp housing 2, said shades being drawn along, closing aperture 7 until its length corresponds to the width of inspection desired. It is convenient to employ negator-spring type shades.

In another but similar embodiment shown in FIGURE 4, the lamp housing 2 is provided with a second aperture 7A. In this embodiment, a second sheet 15 of continuously moving material is inspected simultaneously through the use of a second inspection head 9A as shown. In this way, needless duplication of the illuminating source 2 is avoided.

Photoelectric units 3 are used to detect any of the illumination from source 2 which has passed through a hole in the work 1. As many of the photoelectric units 3 are used as are necessary for the complete coverage of the work 1. In FIGURE 2, two are shown comprising four photoelectric cells 12 and four filter elements 11. As is shown in FIGURE 2, the said photoelectric units 3 are mounted in, and supported by, the inspection head 9. Said inspection head 9, along with shields 10A and 10B, also provides shielding of the photoelectric units 3, (3A, 3B, etc.) against stray and undesirable radiation. The said shields 10A and 10B serve a second purpose by forming at the lower surface of the inspection head 9, an aperture 13. The width of said aperture 13 may be so adjusted as to give the required definition as regards accurate knowledge of the position of a detected hole in the direction of travel of the work.

In other words, aperture 13 can ensure a sharp inspect line at right angles to the paper motion, thereby satisfying an essential requirement for accurate marking or sorting of defects. Especially so when the processing machine is a sheeter-sorter, for selecting cut sheets into two compartments for rejects and accepts.

Further, aperture 13 being relatively close and parallel to the plane of the paper, and in a relatively greater distance from the photocathode of the photoelectric receiver (cell), the maximum and optimum solid angle of light which can pass through a hole between lamp and photocell is not reduced or limited in any way by the aperture, thereby ensuring maximum sensitivity of response to small holes.

Where a sharp inspect line is not required, the aperture 13 is not required and therefore the individual photoelectric units 3 may be mounted individually on a support frame rather than in the inspection head 9 as shown.

FIGURE 1 shows the connections in block form from the photoelectric units 3A and 3B to the amplifiers 4A and 4B. It will be noted that no two adjacent photoelectric cells 12 are connected to the same amplifier, but rather the connections are "interleaved." This will be recognized by those skilled in the art as a differential connection wherein the differential amplifier 4A amplifies the difference between the signals produced by photoelectric cells 12A and 12C. In a like manner differential amplifier 4B amplifies the difference between the signals produced by photoelectric cells 12B and 12D. Through this arrangement signals representing the presence of holes are amplified normally, whereas stray and undesirable signals, such as line hum and noise, ambient light changes, which generally affect all the circuits more or less equally, are not amplified.

The various components which follow the photoelectric units 3 and specifically including the amplifiers 4 and their said integrators, trigger pulse generator 5 and adjustable delay 6, are all included and described in detail in Canadian Patent No. 638,763. Interconnection and operation of these aforementioned devices is performed in a similar manner and the benefits derived are the same.

The signal-to-noise ratio of the inspection system is increased by orders of magnitude by transmitting the greastest possible electromagnetic energy in the narrowest possible spectral range; indeed, the ultra-violet lamp used as a transmitter should transmit ideally at a single wave length. This condition is well satisfied by the use of "black light" lamps transmitting at 3,650 angstrom units of wave lengths The glass filter in front of the receiver (photocell) has a corresponding and very narrow band of transmission. Hence, the "selective filtering" principle is well preserved in the device up to this stage. Further selective filtering is possible by using a photocell, the photo-cathode of which has a narrow wave length sensitivity for electromagnetic radiation and which is peaked at 3,650 angstrom units. The above described differential system of cell connection and amplification preserves without interference the high signal-to-noise ratio of the "three stage" use of the hereinbefore described selective filtering system.

Many changes and arrangements are possible without departing from the spirit and essential characteristics of the invention. The terms used are terms of reference and description, and not terms of limitation.

We claim:
1. A method for detecting defects such as holes and voids in moving sheet material, said sheet material being substantially opaque to electromagnetic radiation in a sharp region of about 3650 A. in the ultra-violet section of the spectrum, the method comprising illuminating one surface of the sheet material being inspected with electromagnetic radiation in said sharp region in the ultra-violet section of the spectrum and detecting any of said electromagnetic radiation in said sharp region which passes through defects in said sheet material by means of a photoelectric cell responsive to radiation in said sharp region while preventing light in the visible section of the light spectrum from causing any response by said photoelectric cell.

2. Apparatus for the detection of holes and voids in moving sheet material, said sheet material being substantially opaque to electromagnetic radiation in a sharp region of about 3650 A. in the ultra-violet section of the spectrum, an inspection head position adjacent one surface of said sheet material, said inspection head containing at least one photoelectric cell, said photoelectric cell being responsive to radiation in said sharp region, filter means covering said photoelectric cell, said filter means being highly absorptive to radiation in the visible section of the light spectrum while transmitting freely radiation at wave lengths in said sharp region, at least one lamp located so as to illuminate the surface of said sheet material opposite said one surface, the radiation of said lamp being substantially confined to said sharp region, said lamp, filter and photoelectric cell forming a system of high selectivity characterized by a high signal-to-noise ratio.

3. Apparatus according to claim 2 wherein said inspection head is located over said sheet material and said lamp is located under said sheet material.

4. Apparatus for the detection of holes and voids in moving sheet material, said sheet material being substantially opaque to electromagnetic radiation in the region of 3,650 angstrom units of wave lengths, comprising:
   an inspection head positioned adjacent one surface of said sheet material, said inspection head containing at least four photoelectric cells, said photoelectric cells being responsive to radiation in the region of 3,650 angstrom units of wave lengths;
   filter means covering each of said photoelectric cells, said filter means being highly absorptive to radiation in the visible section of the light spectrum while transmitting freely radiation at wave lengths on the region of 3,650 angstrom units;
   at least one lamp located adjacent the other surface of said sheet material opposite said inspection head, the radiation of said lamp being substantially confined to the region 3,650 angstrom units of wave lengths, said lamps, filters and photoelectric cell forming a system of high selectivity characterized by a high signal-to-noise ratio;
   at least two balanced push-pull amplifiers, each amplifier having two input electrodes, each input electrode being connected to one of said photoelectric cells, and each amplifier having one output electrode, whereby equal in-phase signals applied simultaneously to said input electrodes in each amplifier produce no output signal across said output electrodes; and
   a utilization circuit connected across said output electrodes.

5. Apparatus according to claim 4 wherein shielding means is attached to said inspection head whereby to shield said photoelectric cells from substantially all ambient illumination and permit transmission of the desired radiation without attenuation.

6. Apparatus according to claim 4 employing at least two of said amplifiers and wherein the adjacent photoelectric cells are connected to the input electrodes of different amplifiers, so that adjacent photoelectric cells which can be modulated in the same degree by a hole in the inspected sheet material and located between said adjacent photoelectric cells are attached to different amplifiers.

7. Apparatus according to claim 4 wherein said utilization circuit comprises a pulse generator responsive only to signals above a predetermined level connected to said output electrodes, an integrator connected between said output electrodes and said pulse generator, said integrator having a time constant corresponding to the time or travel beneath said inspection head of one or more very small holes, each of which is too small to produce an amplified signal at said output electrodes greater than said predetermined level, but such holes producing in said integrator an integrated output signal greater than said predetermined level.

8. Apparatus according to claim 4 wherein the said photo-electric cells are simple, two element cells, responsive to radiation in the region of 3,650 angstrom units of wave lengths and wherein said filter means is a simple transmittance filter without phosphor or other energy or wave length conversion means.

References Cited

UNITED STATES PATENTS

| | | |
|---|---|---|
| 2,866,376 | 12/1958 | Cook. |
| 2,939,963 | 6/1960 | Rideout. |
| 3,128,385 | 4/1964 | Scharf et al. |
| 3,361,025 | 2/1968 | Fiat. |
| 3,361,025 | 2/1968 | Gaffard. |

RALPH G. NILSON, Primary Examiner

M. ABRAMSON, Assistant Examiner

U.S. Cl. X.R.

250—83.3